United States Patent [19]

Brown et al.

[11] Patent Number: 5,356,235
[45] Date of Patent: Oct. 18, 1994

[54] LOCKING MECHANISM

[76] Inventors: A. Gentry Brown, 3793 Rockwood Way, Apt. A, West Valley City, Utah 84120; Ronald L. Wimmer, 3193 S. 9100 West, Magna, Utah 84044

[21] Appl. No.: 955,689

[22] Filed: Oct. 2, 1992

[51] Int. Cl.$^5$ .............................................. F16B 2/18
[52] U.S. Cl. ................................... 403/350; 403/342; 403/308; 273/80 D
[58] Field of Search ............ 273/80 D; 403/350, 342, 403/308, 274; 29/512

[56] References Cited

U.S. PATENT DOCUMENTS

| | | | |
|---|---|---|---|
| 2,509,563 | 5/1950 | Grashow | 403/308 X |
| 3,259,407 | 7/1966 | Welt | 403/350 |
| 4,076,437 | 2/1978 | Mazzolla | 403/350 |
| 4,315,585 | 2/1982 | Seitz | 403/350 X |

FOREIGN PATENT DOCUMENTS 1181818  1/1959  France ............................... 403/274

*Primary Examiner*—Randolph A. Reese
*Assistant Examiner*—Christopher J. Novosad
*Attorney, Agent, or Firm*—Bryan A. Geurts

[57] ABSTRACT

An extensible and retractable golf club is provided, including interior and exterior telescoping hollow shaft members slidably interconnected, a handle securely attached to the free end of the exterior shaft member, a club head securely attached to the free end of the interior shaft member, and a locking mechanism which temporarily maintains the two telescoping shaft members in a desired position relative to each other. The locking mechanism includes first and second pieces which are transferrable from an open position, wherein the two pieces are axially aligned and the two telescoping shaft members slidable relative to each other, to a closed position, wherein the two pieces are not axially aligned and the two telescoping shaft members are not slidable relative to each other. Transfer of the two pieces of the locking mechanism from the open to the closed position is accomplished by twisting the shaft members relative to each other less than one full revolution.

20 Claims, 3 Drawing Sheets

LOCKING MECHANISM

BACKGROUND

1. Field

This invention relates generally to the game of golf and more specifically to a novel locking mechanism wherein telescoping golf club shafts may be situated in a desired position relative to each other and then temporarily locked into that position while a golf shot is made.

2. Prior Art

The game of golf is one of the oldest and most enduring games in the history of human civilization. Literally millions of participants enjoy the intense competition, the relaxed pace, the graceful swings and the beautiful park-like courses, as well as a number of other features, that the game has to offer.

Golf is also one of the most watched spectator sports in America, with tournaments being televised nearly every weekend. Consequently, golf professionals can command some of the largest salaries and paydays of any professional athletes. This is true not only of the tournaments themselves, but also of the endorsements of golf related products as well. The golf industry is further a multi-million dollar industry in terms of real estate for golf courses, specialty clothing for participants, and especially golf clubs and related paraphernalia.

It is estimated that several hundred different designs of golf clubs exist today with which to address the various shots required to be made by a golfer during the normal course of a nine or eighteen hole round of golf. Obviously, it is impractical for a golfer to carry a hundred or more clubs with him or her while playing a round of golf, even when using a golf cart, and thus it behooves every golfer to choose a limited number of standard clubs to be carried in his/her golf bag. These usually include two or three different drivers for hitting long shots off a tee, several irons having varying degrees of pitch for intermediate and short approach shots, and at least one putter for gently tapping the ball into the cup when the ball is on the green.

Of the types of golf putters available today, the most common one comprises a long slender shaft with a handle (usually rubber or leather) disposed at one end and a specialized putter head disposed at the other. A putter can be made distinguishable from others in any number of different ways, perhaps most significantly by either shortening or lengthening the shaft. For example, a golfer may use a relatively short-shafted putter for puts of twenty feet or less, and then use a long-shafted putter for longer puts or puts which are made from the fringe of the green. The latter type of putter involves using a different technique wherein the handle of the putter is held pivotally near the nose or chin of the golfer with one hand while the other hand grasps the shaft at a lower position on the shaft to actuate the swinging action.

It would be a great advantage to golfers if a single putter were to be devised which was extensible and retractable. Such a putter would allow a golfer to carry only one putter in his golf bag instead of two or three in order to make different types of puts. Further, such a club would be less bulky in a golfer's bag in that it would not stick out of the bag like the long-shafted putter mentioned above. Also, and perhaps more importantly, a single, multi-functional putter would cost less than a number of different putters which would have to be purchased separately.

Applicants are aware of a multi-functional, extensible putter currently available on the market. While providing the advantages listed above, however, this putter has a number of disadvantages as well. This particular putter has a shaft which actually comprises a series of shorter length shafts which have matching interior and exterior threads at the ends. If the putter is to be made shorter, then fewer of the shorter length shafts are attached together; conversely, if the length of the putter is to be made longer, then more of the shorter length shafts are included.

One of the problems that exist with this prior art putter is the inordinate length of time and effort involved in making required changes. For example, it could easily happen that a longer putter is needed by a certain golfer to make a long put. If he misses this put, then that golfer would probably require a shorter putter to make the follow up shot. Other golfers playing with this particular golfer, as well as all other golfers playing behind them, will have to wait several extra minutes while the change is being made by unscrewing and screwing in the requisite number of shorter length shafts.

Another disadvantage of this type of putter is the liklihood that one or more of the shorter length shafts would become lost, since a number of them ,would, at any given time, be detached from the putter and simply loose in the bag. If not lost from the bag, these shorter length shafts, in particular the threaded ends, could easily become damaged and therefore unusable.

Hence, it would be a great improvement in the art if a putter were introduced to the game of golf which could be extended or retracted with a minimum of time and effort, and which had no loose pieces which could become lost within a golf bag or stolen.

BRIEF SUMMARY AND OBJECTS OF THE INVENTION

Accordingly, it is a principal objective of the present invention to provide a locking mechanism which temporarily maintains two hollow telescoping shafts in a desired position and which is easily and efficiently locked and unlocked.

A further major principal of this invention is the provision of a locking mechanism which is small, unobtrusive, reliable, economical, lightweight, easily manufactured, safe, easily operated and efficient.

Still another important object of the invention is to provide a golf putter which is extensible and retractable to desired positions such that the necessity for a plurality of putters is obviated.

Yet a further significant objective is the provision of a golf putter which is less bulky to carry in a standard golf bag.

Another major object is to provide a golf putter which is extensible and retractable to any of a number of desired positions, and yet is self-contained in a single apparatus.

These and other objects and features of the invention are represented in a preferred embodiment of the invention described below. In general, the preferred embodiment of the locking mechanism includes two telescoping hollow shaft members to be held temporarily together in a desired position relative to each other, a first piece which is attached to the interior of one end of the interior shaft member, and a second piece.

The two telescoping hollow shaft members are presently contemplated to be golf club shafts, in particular for a putter, however it will be recognized that other types of telescoping members may fall within the scope of this invention, such as curtain rods.

The first piece includes first and second ends, as well as a central portion. The first end of the first piece is for attachment of the locking mechanism to one of the ends of the interior shaft member. Preferably, the first end includes a portion which is cylindrically shaped, the outside surface of which fits slidably into the one end of the interior telescoping member. Glue or a similar adhesive may be disposed between the outside surface of the first end and the one end of the interior telescoping member.

Alternatively, the cylindrically shaped portion may be compression fit into the interior telescoping member. This provides a friction force between the outside surface of the cylindrically shaped portion and the interior surface of the interior telescoping member which prevents movement.

The central portion of the first piece has a generally cylindrical shape and includes a tab which extends approximately one fourth the circumferential distance around the central portion.

The second end of the first piece is a shaft which has a longitudinal axis eccentric to the longitudinal axis of the cylindrically shaped central portion. Advantageously, the second piece is also generally cylindrical in shape and includes an eccentric bore through which the shaft of the first piece passes.

Also, the second piece includes a tab which is in rotational communication with the tab attached to the central portion of the first piece. This tab, similar to the first, extends approximately one fourth the circumferential distance around the second piece. With this configuration, one skilled in the art will notice that the circumferential distance between the contact point of first edges of the two tabs and the contact point of the other edges of the two tabs is approximately one half. Thus, when the first edges of the two tabs are in contact with each other, the first and second pieces are in axial alignment, and when the second edges of the two tabs are in contact with each other, the first and second pieces are not in axial alignment.

Advantageously, the eccentric shaft has both distal (away from the central portion) and proximate (attached to the central portion) ends, the distal end of the shaft being equipped to maintain the shaft within the eccentric bore of the second piece. This may be simply flared edges or may be a washer which is securely fastened thereto. Attachment of the washer to the shaft is preferably accomplished either by a screw or by the use of corresponding matching threads on the shaft and the washer.

DESCRIPTION OF THE DRAWINGS

In order that the manner in which the above-recited and other advantages and objects of the invention are obtained can be appreciated, a more particular description of the invention briefly described above will be rendered by reference to a specific embodiment thereof which is illustrated in the appended drawings. Understanding that these drawings depict only a typical embodiment of the invention and are therefore not to be considered limiting of its scope, the invention will be described and explained with additional specificity and detail through the use of the accompanying drawings in which.

DETAILED DESCRIPTION

Figure 1:
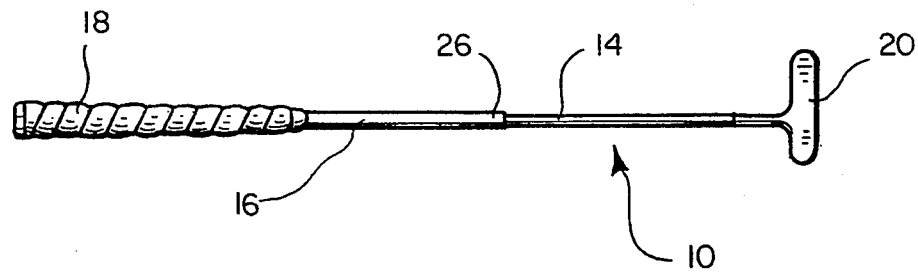
FIG. 1 is presently preferred golf putter shown in elevation utilizing the principles and teachings of the present invention.
Figure 2:
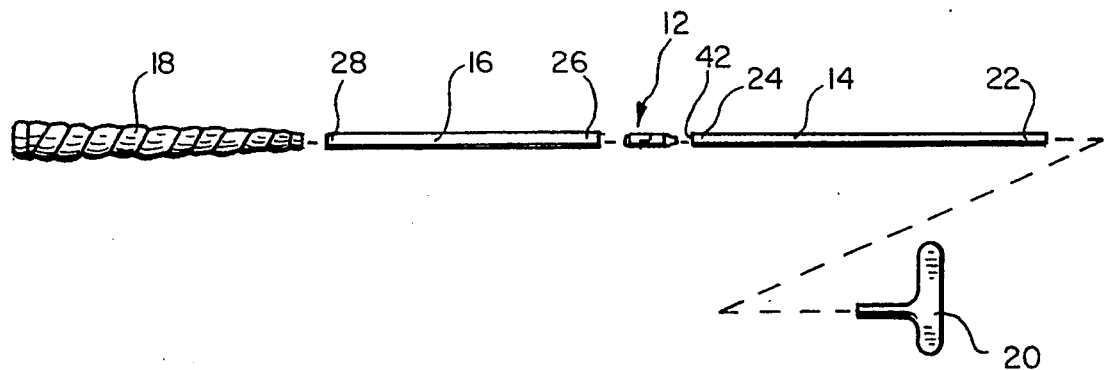
FIG. 2 is an exploded elevational view of the golf putter of FIG. 1 showing the locking mechanism relative to the rest of the putter.

Reference is now made to the drawings wherein like numerals are used to denote like component parts throughout. Referring first to FIGS. 1 and 2, an extensible and retractable golf putter 10 is illustrated which comprises a locking mechanism 12, an interior telescoping hollow shaft member 14, an exterior telescoping hollow shaft member 16, a handle 18, and a putter head 20. Each of these components will be described in greater detail hereinafter.

The interior shaft member 14 has a first end 22 and a second end 24. Similarly, the exterior shaft member 16 includes first and second ends 26 and 28, respectively. FIGS. 1 and 2 clearly demonstrate how the second end 24 of the interior member 14 extends slidably into the first end 26 of the exterior member 16 in telescoping fashion.

Shaft members 14 and 16 are preferably constructed of a relatively lightweight structural material such as steel, which may be plated for durability and appearance purposes, or a graphite or similar extruded composite. However, one skilled in the art will recognize that other materials may be used without departing from the scope of this invention, such as plastic. Optionally, the shaft members 14 and 16 may be made of two different materials of different density in order to produce a more pronounced pendulum effect when swinging the putter 10. In this situation, the material of which the interior shaft member 14 is constructed is more dense than the material of which the exterior shaft member 16 is constructed.

As mentioned above, and as shown in FIGS. 1 and 2, a handle or grip 18 is attached to the second end 28 of the exterior member 16. The handle 18 is standard in the golf industry and therefore need not be described in detail herein. At present preference, the handle 18 is constructed of rubber or leather, and is compression fit onto the second end 28.

FIGS. 1 and 2 further illustrate the putter head 20, which, similar to the handle 18, is standard in the golf industry. As one skilled in the art well knows, there are many different types of putter heads in use today, and the illustration of one of these in the appended drawings is not meant to limit the use of other putter heads which perform a similar function in a similar manner. As shown, the head 20 is securely attached to the first end 22 of the interior member 14 in a standard manner.

Figure 3:
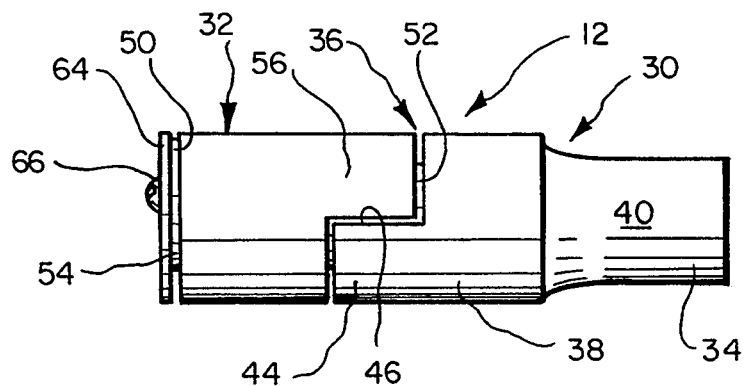
FIG. 3 is a side elevational view of the locking mechanism shown with the first and second pieces in an axially aligned, or open, position.
Figure 4:
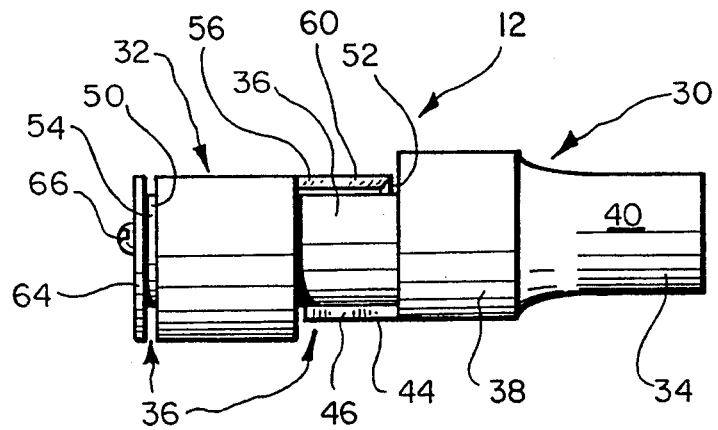
FIG. 4 is a side elevational view of the locking mechanism similar to FIG. 3 except shown with the first and second pieces in an axially non-aligned, or closed, or locked, position.
Figure 5:
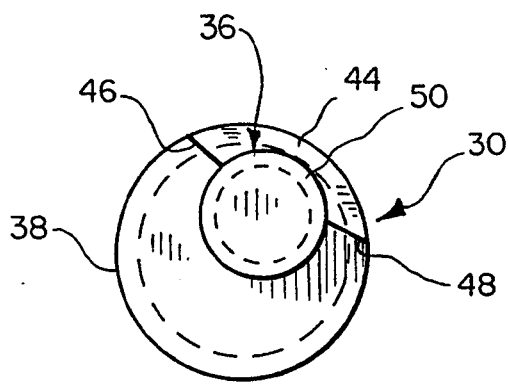
FIG. 5 is an isolated plan view of the first piece of the locking mechanism.

Referring now to FIGS. 3 through 6, the locking mechanism 12 is illustrated in greater detail. The locking mechanism 12 serves as a means for temporarily maintaining the interior and exterior members 14 and 16, respectively, in a desired position relative to each other and comprises generally a first piece 30 and second piece 32. As best shown in FIGS. 3, 4, and 5, the first piece 30 includes a first end 34, a second end 36 and a central portion 38.

Preferably, the first end 34 of the first piece 30 is for securely attaching the first piece 30 to the second end 24 of the interior member 14. In this regard, the first end 34 is a cylindrical portion having an outside surface 40 which fits slidably into the second end 24. Advantageously, a glue or similar adhesive, not shown, is disposed between the outside surface 40 of the first end 34 and the second end 24 of the interior member 14. Optionally, the cylindrical portion of first end 34 is compression fit into interior telescoping member 14 at the end 24 such that friction between the outside surface 40 of the first end 34 and the interior surface 42 of the interior member 14 prevents movement.

The central portion 38 of the first piece 30 has a generally cylindrical shape and includes a first tab 44. The tab 44 has first and second edges 46 and 48, respectively, and extends approximately one fourth the circumferential distance around the central portion 38, as best seen in FIG. 5.

The second end 36 of the first piece 30 comprises a small cylindrical shaft 50 which is eccentric to the central portion 38 of the first piece 30. See FIG. 4. The shaft 50 includes a proximate end 52, disposed adjacent to the central portion 38, and a distal end 54.

Figure 6:
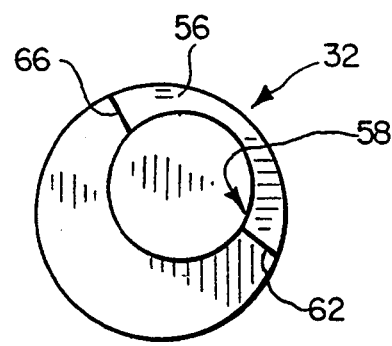
FIG. 6 is an isolated plan view of the second piece of the locking mechanism.

Referring now to FIGS. 3, 4, and 6, the second piece 32 of the locking mechanism 12 is shown to have a generally cylindrical shape and include a second tab 56 and an eccentric bore 58 through which the shaft 50 of the first piece 30 passes. As illustrated in FIGS. 3 and 4, the second tab 56 is in rotational communication with the first tab 44, and includes first and second edges 60 and 62, respectively. Similar to the first tab 44, the second tab 56 extends approximately one fourth the circumferential distance around the second piece 32. With this configuration, one skilled in the art will recognize that the circumferential distance between the contact point of the first edges 46 and 60 of the first and second tabs 44 and 56, respectively, as shown in FIG. 3, and the contact point of the second edges 48 and 62 of the first and second tabs 44 and 56, respectively, as shown in FIG. 4, is approximately one half, or, in other words, about 180 degrees.

Preferably, the distal end 54 of the shaft 50 includes some provision for maintaining the shaft 50 within the eccentric bore 58 of the second piece 32. This may be simply flared edges, not shown, formed by tapping the distal end 54 with a hammer or similar. Alternatively, this provision may comprise a washer 64 securely fastened to distal end 54 of the eccentric shaft 50. In this case, the washer 64 may be fastened thereto by a screw 66, as illustrated in FIGS. 3 and 4, or by any other standard method known in the industry, such as by the use of matching threads on the distal end 54 and the washer 64, not shown.

In use, the locking mechanism 12 has both an open position, seen in FIG. 3, and a closed position, seen in FIG. 4. The interior and exterior members 14 and 16, respectively, are slidable relative to each other in the open position, since the first and second pieces 30 and 32, respectively, are in axial alignment. As seen, in the open position the first edges 46 and 60 of the first and second tabs 44 and 56, respectively, are in contact with each other, whereas in the closed position the second edges 48 and 62 of the first and second tabs 44 and 56, respectively, are in contact with each other.

The locking mechanism 12 is transferrable between the open and closed positions by twisting the interior shaft member 14 and the exterior shaft member 16 relative to each other. Movement between the open and closed positions requires less than a one full revolution twist.

Figure 7:
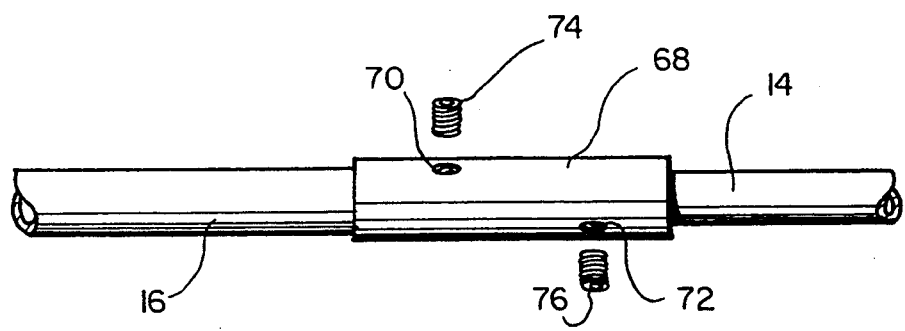
FIG. 7 is a partial cutaway elevational view of an optional cover for the locking mechanism.
Figure 8:
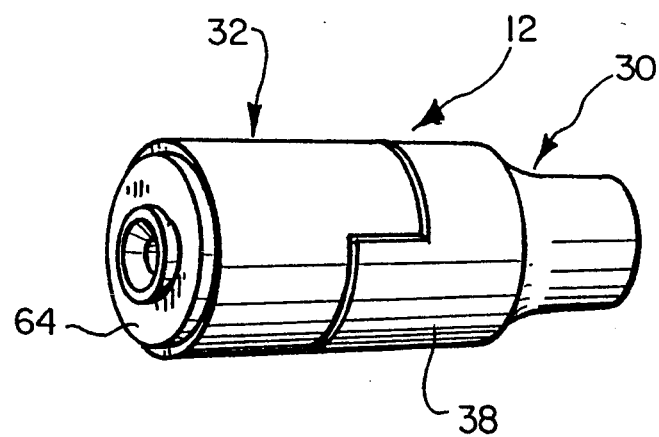
FIGS. 8 and 9 show perspective views of the locking mechanism.
Figure 9:
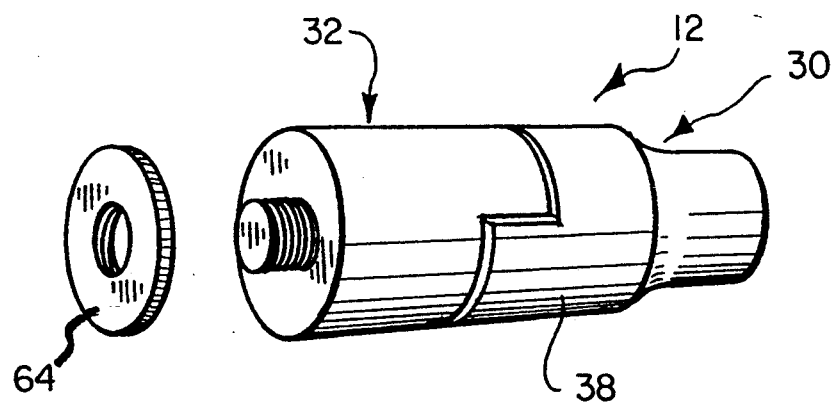

Referring now to FIG. 7, a cover 68 is shown which protects the locking mechanism 12, and serves to maintain it in the closed position. As illustrated, the cover 68 comprises a generally cylindrical body which can be slid into position, and apertures 70 and 72 through which Allen screws 74 and 76 pass to secure the cover 68 in place. Use of the cover 68 allows use of the golf putter 10 in United States Golf Association sanctioned events.

The invention described herein may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A locking mechanism for temporarily maintaining two telescoping hollow shaft members in a desired position relative to each other, consisting of:
    a first piece having first and second ends and a central portion,
        the first end including attachment means for securing the first piece to one end of the interior of one of said telescoping members,
        the central portion having a generally cylindrical shape and including a first tab with first and second edges, and
        the second end comprising a shaft which is eccentric to the central portion, and
    a second piece having a generally cylindrical shape and including
        a second tab in rotational communication with the first tab, the second tab including first and second edges, and
        an eccentric bore through which the shaft of the second end of the first piece passes,
    such that when the first edges of the first and second tabs are in contact with each other, the first and second pieces are in axial alignment, and when the second edges of the first and second tabs are in contact with each other, the first and second pieces are not in axial alignment.

2. A locking mechanism according to claim 1 wherein the attachment means includes a cylindrical portion having an outside surface which fits slidably into the one end of the interior telescoping member and includes an adhesive disposed between the outside surface of the cylindrical portion and the one end of the interior telescoping member.

3. A locking mechanism according to claim 1 wherein the interior telescoping member includes an interior surface and the attachment means includes a cylindrical portion having an outside surface, and the cylindrical portion is compression fit into the interior telescoping member such that friction between the outside surface of the cylindrical portion and the interior surface of the interior telescoping member prevents movement.

4. A locking mechanism according to claim 1 wherein the first tab extends approximately one fourth the circumferential distance around the central portion and the second tab extends approximately one fourth the circumferential distance around the second piece.

5. A locking mechanism according to claim 1 wherein the eccentric shaft includes a distal end and a proximate end, the distal end including means for maintaining the eccentric shaft of the second end of the first piece within the eccentric bore of the second piece.

6. A locking mechanism according to claim 5 wherein the means for maintaining the eccentric shaft of the second end of the first piece within the eccentric bore of the second piece comprises flared edges on the distal end of the eccentric shaft.

7. A locking mechanism according to claim 5 wherein the means for maintaining the eccentric shaft of the second end of the first piece within the eccentric bore of the second piece comprises a washer securely fastened to the distal end of the eccentric shaft and wherein the distal end of the eccentric shaft is threaded, and the washer includes matching threads, such that the washer is securely fastened to the distal end of the eccentric shaft thereby.

8. A locking mechanism for temporarily maintaining two telescoping hollow shaft members in a desired position relative to each other, consisting of:
   a first piece having first and second ends and a central portion,
      the first end including attachment means for securing the first piece to one end of the interior of one of said telescoping members,
      the central portion having a generally cylindrical shape and including a first tab with first and second edges, and
      the second end comprising a shaft which is eccentric to the central portion, and
   a second piece having a generally cylindrical shape and including
      a second tab in rotational communication with the first tab, the second tab including first and second edges, and
      an eccentric bore through which the shaft of the second end of the first piece passes,
   such that when the first edges of the first and second tabs are in contact with each other, the first and second pieces are in axial alignment, and when the second edges of the first and second tabs are in contact with each other, the first and second pieces are not in axial alignment.

9. A locking mechanism according to claim 8 wherein the attachment means includes a cylindrical portion having an outside surface which fits slidably into the one end of the interior telescoping member.

10. A locking mechanism according to claim 9 wherein the attachment means further includes an adhesive disposed between the outside surface of the cylindrical portion and the one end of the interior telescoping member.

11. A locking mechanism according to claim 8 wherein the interior telescoping member includes an interior surface and the attachment means includes a cylindrical portion having an outside surface, and the cylindrical portion is compression fit into the interior telescoping member such that friction between the outside surface of the cylindrical portion and the interior surface of the interior telescoping member prevents movement.

12. A locking mechanism according to claim 8 wherein the first tab extends approximately one fourth the circumferential distance around the central portion.

13. A locking mechanism according to claim 8 wherein the second tab extends approximately one fourth the circumferential distance around the second piece.

14. A locking mechanism according to claim 8 wherein the circumferential distance between the contact point of the first edges of the first and second tabs and the contact point of the second edges of the first and second tabs is approximately one half.

15. A locking mechanism according to claim 8 wherein the eccentric shaft includes a distal end and a proximate end, the distal end including means for maintaining the eccentric shaft of the second end of the first piece within the eccentric bore of the second piece.

16. A locking mechanism according to claim 15 wherein the means for maintaining the eccentric shaft of the second end of the first piece within the eccentric bore of the second piece comprises flared edges on the distal end of the eccentric shaft.

17. A locking mechanism according to claim 15 wherein the means for maintaining the eccentric shaft of the second end of the first piece within the eccentric bore of the second piece comprises a washer securely fastened to the distal end of the eccentric shaft.

18. A locking mechanism according to claim 17 wherein the washer is securely fastened to the distal end of the eccentric shaft by a screw.

19. A locking mechanism according to claim 17 wherein the distal end of the eccentric shaft is threaded, and the washer includes matching threads, such that the washer is securely fastened to the distal end of the eccentric shaft thereby.

20. A locking mechanism and cover for temporarily maintaining two telescoping hollow shaft members in a desired position relative to each other, comprising:
   a first piece having first and second ends and a central portion,
      the first end including attachment means for securing the first piece to one end of the interior of one of said telescoping members,
      the central portion having a generally cylindrical shape and including a first tab with first and second edges, and
      the second end comprising a shaft which is eccentric to the central portion, and
   a second piece having a generally cylindrical shape and including
      a second tab in rotational communication with the first tab, the second tab including first and second edges, and
      an eccentric bore through which the shaft of the second end of the first piece passes,
   such that when the first edges of the first and second tabs are in contact with each other, the first and second pieces are in axial alignment, and when the second edges of the first and second tabs are in contact with each other, the first and second pieces are not in axial alignment, and a cover enveloping the locking mechanism and adjoining ends of the telescoping members which serves to maintain the telescoping members in a locked position wherein the cover includes apertures through which Allen screws pass to secure the cover in place.

* * * * *